United States Patent [19]

Mabire et al.

[11] Patent Number: 5,417,845
[45] Date of Patent: May 23, 1995

[54] USE OF DECAHYDRO PYRAZINO [2,3-B] PYRAZINE FOR THE REDUCTION OF THE PROPORTION OF FREE OR COMBINED HYDROGEN SULPHIDE PRESENT IN A FLUID

[75] Inventors: Frédéric Mabire, Arcueil; Alain Blanc, Saint Denis, both of France

[73] Assignee: Societe Francaise Hoechst, Puteaux, France

[21] Appl. No.: 46,807

[22] Filed: Apr. 16, 1993

[30]  Foreign Application Priority Data

Dec. 22, 1992 [FR]  France ................................. 92 15465

[51] Int. Cl.⁶ .............................................. C10G 29/20
[52] U.S. Cl. ................................. 208/208 R; 208/236; 208/289; 423/220; 423/226; 252/394
[58] Field of Search .................... 208/47, 208 R, 236, 208/289; 423/220, 226; 252/394

[56]  References Cited

U.S. PATENT DOCUMENTS

| | | | |
|---|---|---|---|
| 2,345,237 | 3/1944 | Chitwood | 260/268 |
| 4,344,861 | 8/1982 | Levy | 208/47 |
| 4,814,447 | 3/1989 | Treybig | 544/384 |
| 4,861,884 | 8/1989 | Treybig | 544/336 |
| 4,895,702 | 1/1990 | Fischer | 422/7 |
| 4,957,640 | 9/1990 | Treybig et al. | 422/16 |
| 4,961,867 | 10/1990 | Treybig | 252/8.555 |
| 4,962,164 | 10/1990 | Jabarin et al. | 525/445 |

FOREIGN PATENT DOCUMENTS

| | | |
|---|---|---|
| 0264261 | 4/1988 | European Pat. Off. . |
| 0383499 | 8/1990 | European Pat. Off. . |
| 0411745 | 2/1991 | European Pat. Off. . |
| 8805039 | 7/1988 | WIPO . |

*Primary Examiner*—Asok Pal
*Assistant Examiner*—Walter D. Griffin
*Attorney, Agent, or Firm*—Browdy and Neimark

[57]  ABSTRACT

Process and use of decahydro pyrazino [2,3-b] pyrazine for the reduction of the proportion of free or combined hydrogen sulphide present in a fluid.

19 Claims, No Drawings

USE OF DECAHYDRO PYRAZINO [2,3-B] PYRAZINE FOR THE REDUCTION OF THE PROPORTION OF FREE OR COMBINED HYDROGEN SULPHIDE PRESENT IN A FLUID

The present invention relates to the use of decahydro pyrazino [2,3-b] pyrazine for the reduction of the proportion of free or combined hydrogen sulphide present in a fluid.

The production fluids from certain oil deposits, as well as certain industrial effluents such as those of water purification plants contain quite large quantities of free or combined hydrogen sulphide. It is known that hydrogen sulphide or sulphuretted hydrogen is a foul-smelling, toxic, inflammable, corrosive and explosive gas. In order to avoid the risks of an accident occurring and/or the corrosion of materials, it is necessary to eliminate or reduce the quantities of free or combined hydrogen sulphide present in the fluids as quickly as possible. For large oil deposits situated on dry land this elimination, although costly, is relatively easy and it sometimes allows, when the proportions of hydrogen sulphide are significant, the possibility of producing sulphur. In the case of an oil workings at sea, an oil deposit with a low yield or a purification plant, quick, inexpensive methods for eliminating hydrogen sulphide are sought which do not require bulky installations or significant investments. In order to do this, the use of an aldehyde has been proposed, such as formaldehyde, glyoxal, acrolein (U.S. Pat. Nos. 1,991,765, 2,426,318, 3,459,852, 4,680,127, 5,085,842, European Patent Applications Nos. 113408, 414170, 416969, German Patent Application No. 3532955), of condensation products of an aldehyde and an alkanolamine such as those described in the U.S. Pat. No. 4,978,512, of condensation products of an aldehyde and primary or secondary amines such as those described in the European Patent Applications Nos. 264261, 383499, 411745, 475641, 475642, of imines or polyimines such as those described in the European Patent Application No. 405719, oxidizing mineral products such as hydrogen peroxide, sodium chlorite, chlorine dioxide, sulphur dioxide, sodium nitrite (European Patent Applications Nos. 82513, 261974, 389150, U.S. Pat. No. 4,515,759 and 4,948,494).

These different products, although active, still have disadvantages, either their effectiveness is too low and involves a high treatment cost, or as a function of the pH of the medium to be treated, their effectiveness is destroyed by salification or by degradation, in particular according to Cannizzaro's reaction for aldehyde derivatives, or their handling is dangerous, in particular for the oxidizing mineral products.

Now, in order to remedy these disadvantages, the Applicant has discovered with astonishment that decahydro pyrazino [2,3-b] pyrazine, called hereafter DHPP, makes it possible to quickly reduce and even eliminate the quantities of free or combined hydrogen sulphide present in a fluid.

DHPP, a product known as an intermediate in the preparation of stabilizers for polymers or explosives, as well as for its vulcanizing properties (FR.1,310,524), is a solid, crystallized product soluble in water, stable at ambient temperature.

It is very easily obtained by reaction of glyoxal with ethylenediamine (H. BAGANZ et al. Ber., 94, 2676, (1961), R. L. WILLER et al., J. Amer. Chem. Soc., 104, 3951, (1982), U.S. Pat. Nos. 2,345,237 and 4,814,447).

This is why a subject of the present invention is the use of decahydro pyrazino [2,3-b] pyrazine for reducing the proportion of free or combined hydrogen sulphide contained in a fluid.

Also a subject of the present invention is a process for reducing the proportions of free or combined hydrogen sulphide in a fluid, a process characterized by that fact that the said fluid is treated with decahydro pyrazino [2,3-b] pyrazine.

The expression "free or combined hydrogen sulphide" can designate hydrosulphuric acid and its mono- and di- metal salts; the thiols of general formula RSH in which R represents a $C_1$–$C_4$ organic radical and their metal salts, hydropolysuphides of general formula $RS_nH$ in which R has the meaning given previously and n represents an integer from 1 to 4, and their metal salts.

The term "fluid" can designate a gas, a liquid, an aerosol or a water-in-oil or oil-in-water emulsion such as an oil deposit production fluid, crude oil (crude petroleum), effluents of purification plants, petroleum gases, various fermentation gases, a gaseous fluid from an oil deposit.

DHPP can be used pure in the crystallized state or preferably in aqueous solution. DHPP can also be used in the crude state in its aqueous preparation solution.

The process according to the invention can be implemented very simply by putting the fluid to be treated in contact, at ambient temperature, with an effective quantity of DHPP to achieve the desired result. If the DHPP is soluble in the fluid to be treated, the DHPP can be used in the crystallized state. Due to this fact, a useful application of DHPP relates to liquid fluids in which it is soluble.

Another useful application is characterized by the fact that the fluid containing hydrogen sulphide in the free state is treated with an aqueous solution of decahydro pyrazino 2,3-b] pyrazine. When the fluid is gaseous or when it does not dissolve the DHPP, this liquid or gaseous fluid is preferably treated with a concentrated aqueous solution of DHPP, either by simple mixing in the case of a liquid, or by bubbling the gaseous fluid through an aqueous solution of DHPP; washing towers can also be used in which the fluid to be treated and an aqueous solution of DHPP circulate in opposite directions.

The quantities of DHPP used in the process according to the invention are a function of several parameters: type of fluid, result desired and initial proportion of free or combined hydrogen sulphide. The effective quantities are easily determined by a few preliminary tests. When total elimination of the free or combined hydrogen sulphide present in crude petroleum is desired, larger quantities of DHPP must be used than for obtaining the same result in an aqueous fluid containing the same quantity of free or combined hydrogen sulphide. Generally in order to eliminate 1 mole of free or combined hydrogen sulphide, 0.1 to 5 moles of DHPP are used, preferably 0.2 to 3 moles of DHPP.

If these effective quantities are expressed in weight of DHPP per equivalent weight of sulphuretted hydrogen, these quantities vary from 0.4 to 20.8 mg of DHPP per mg of equivalent.

The process according to the invention described above is particularly suitable for treating fluids, in particular liquids and especially aqueous fluids, containing less than 5 mmoles per liter of free or combined hydrogen sulphide.

The process of the invention can be used to treat oil deposit production fluids, in this case, an aqueous solution of DHPP is injected either at the down hole or well head at a dose of 1 to 20 ppm of DHPP per ppm of free or combined hydrogen sulphide present in this production fluid. Also in the oil industry, the process of the invention can be used to reduce the proportions of free or combined hydrogen sulphide present in the constituents of the production fluid: water, crude oil and gas leaving the separators. The gas and crude petroleum are preferably treated in washing towers in which an aqueous solution of DHPP is circulated at a dose of 5 to 30 ppm of DHPP per ppm of free or combined hydrogen sulphide present in these fluids. Water is advantageously treated by introducing a solution of DHPP into the storage tanks at a dose of 1 to 15 ppm per ppm of free or combined hydrogen sulphide present.

The following examples illustrate the present invention without however limiting it.

EXAMPLE 1

4 aqueous solutions are prepared, called A, B, C and D, containing respectively by weight:

A: 40% (0.281 mole) of decahydro pyrazino [2,3-b] pyrazine, DHPP,
B: 40% (0,689 mole) of glyoxal,
C: 40% (0,182 mole) of hexahydro tri(2-hydroxy ethyl)-1,3,5 s-triazine, HTHET,
D: 40% (0,666 mole) of ethylenediamine. Meanwhile, an aqueous solution is prepared under an inert atmosphere containing 0.18 g (0.75 mmole) of sodium sulphide crystallized with 9 molecules of water and 12 mg of sodium hydroxide per liter. This solution is then brought to pH=7.5 with a 0.05 M aqueous solution of nitric acid. This solution is called T.

0.4 l of solution T is treated at ambient temperature, under an inert atmosphere and under agitation for 10 minutes, with 0.15 g of solution A, that being 60 mg of DHPP, then the reaction medium is acidified to pH=5 with a 0.05 M aqueous solution of nitric acid. The reaction solution is then degassed for 30 minutes with nitrogen bubbling through it (flow rate 25 l/hr) and the gases entrained are then washed in a series of washing flasks containing in total 0.1 liter of a 1 M aqueous solution of sodium hydroxide. Analysis is then carried out by potentiometric analysis with a silver electrode, using a 0.1 M aqueous solution of silver nitrate, the hydrogen sulphide being trapped in the gas washing flasks. The quantity Q of hydrogen sulphide entrained, expressed in mg/l, is calculated by expression (1)

$$Q = \frac{V \times 0.1 \times 34.08}{0.4 \times 2} = 4.26\, V \quad (1)$$

in which V represents the volume of the aqueous solution of silver nitrate used.

The effectiveness E, expressed as a % by weight, of aqueous solution A is calculated by expression (2)

$$E = \frac{Q_0 - Q}{Q_0} \times 100 \quad (2)$$

in which $Q_0$ represents the quantity in mg/l of hydrogen sulphide analyzed in solution T using the same analysis procedure (acidification to pH=5 with 0.05 M nitric acid, followed by entrainment with a nitrogen current of the hydrogen sulphide formed, trapping of this acid in the 1 M soda solution then analysis by potentiometric analysis with a 0.1 M solution of silver nitrate). The preceding test is reproduced with solutions B and C, then with 0.3 g and 0.6 g of solutions A, B and C, and finally with 0.6 g of solution D. The results of the effectiveness, E, of these 10 tests are given in table I as a function of the respective weights of solutions A, B, C or D used.

TABLE 1

| | Effectiveness, E, as a function of the dose used | | |
|---|---|---|---|
| Doses | 0.15 g | 0.30 g | 0.60 g |
| A | 46 | 78 | 95 |
| B | 11 | 25 | 48 |
| C | 4 | 15 | 25 |
| D | | | 0 |

It is noted that aqueous solution A is clearly more effective than solutions B and C. The use of 0.6 g of DHPP in aqueous solution thus makes it possible to reduce the quantity of hydrogen sulphide contained in 1 liter of water by 95% when this quantity is of the order of 20 to 25 ml/l. Solution D is inactive at the dose used.

EXAMPLE 2

In this example, the effectiveness is evaluated of solutions A, B and C prepared in Example 1 for reducing the proportion of hydrogen sulphide contained in a light crude petroleum, P, from a well in the North Sea, containing at the start 60 ppm of hydrogen sulphide.

This example was carried out according to an operating method quite similar to that described in Example 1. The crude petroleum P, 0.4 l, was treated for 30 minutes with 0.18 g and 0.30 g of solution A, B and C. The results of the effectiveness of these 6 tests are given in table II as a function of the respective weights of solutions A, B and C used.

TABLE 2

| | Effectiveness, E, as a function of the doses | |
|---|---|---|
| Doses | 0.18 g | 0.30 g |
| A | 64 | 75 |
| B | 20 | 47 |
| C | 61 | 71 |

It can be noted from examination of table II that the use of 0.3 g of DHPP in aqueous solution makes it possible to reduce to 15 ppm the quantity of hydrogen sulphide contained in 1 liter of a light crude petroleum originally containing 60 ppm of hydrogen sulphide.

EXAMPLE 3

1 kg of an aqueous solution, having a pH of 7.5 and containing 1 mg (0.03 mmole) of hydrogen sulphide in a salified state is treated according to Example 1 with 0.05 g of solution A, that being 20 mg (0.14 mmole) of DHPP. At the end of treatment, a solution without free or combined hydrogen sulphide is obtained.

EXAMPLE 4

50 l/hr of nitrogen and 50 l/hr of hydrogen sulphide are bubbled through a series of 3 gas washing flasks containing 290 g in total of an aqueous solution containing 20% by weight of DHPP, that being 58 g (408 mmoles), followed by a series of 3 gas washing flasks containing 0.3 l in total of 1 M soda, that being 0.3 mole of sodium hydroxide. After bubbling through for 15 minutes, circulation of the gases is stopped. Analysis carried out on the soda solution reveals no presence of sulphur. All the gaseous hydrogen sulphide which was bubbled through the aqueous solution of DHPP was absorbed.

EXAMPLE 5: Study of the stability of DHPP

A 1M molar solution of DHPP in water is prepared, then 1 liter of this solution is acidified to pH=2 with concentrated hydrochloric acid. In this way 1329 g of a solution is obtained containing 142.06 g (1 mole) of DHPP and 121.7 g (3.34 mole) of hydrogen chloride. This solution is left for 15 hours at ambient temperature, then the proportion of glyoxal which may be present in this solution is analyzed by polarography. In this way 0.1145 mole of glyoxal is determined, that being 11.45% of the theoretical quantity calculated for a total hydrolysis of the DHPP. The same analysis of glyoxal is carried out on the 1 M aqueous solution of DHPP, and after 15 hours no formation of glyoxal is noted. It is deduced from this that DHPP in aqueous solution is stable in an alkaline medium and that it decomposes only very slightly in an acid medium.

We claim:

1. A process for reducing the amount of free or combined hydrogen sulfide present in a fluid comprising contacting said fluid with an effective amount of decahydropyrazino [2,3-b] pyrazine and for a period of time sufficient to reduce the level of free or combined hydrogen sulfide in said fluid.

2. A process according to claim 1, wherein the fluid is an oil deposit production fluid.

3. A process according to claim 1, wherein the fluid is a crude petroleum.

4. A process according to claim 1, wherein the fluid is a gaseous fluid from an oil deposit.

5. A process according to claim 1, wherein the fluid is a liquid fluid in which decahydro pyrazino [2,3-b] pyrazine is soluble.

6. A process according to claim 1, wherein the fluid contains at least 5 moles per liter of hydrogen sulfide.

7. A process according to claim 2, wherein the fluid contains at least 5 moles per liter of hydrogen sulfide.

8. A process according to claim 3, wherein the fluid contains at least 5 moles per liter of hydrogen sulfide.

9. A process according to claim 4, wherein the fluid contains at least 5 moles per liter of hydrogen sulfide.

10. A process according to claim 5, wherein the fluid contains at least 5 moles per liter of hydrogen sulfide.

11. A process according to claim 1 wherein said contacting is carried out at ambient temperature.

12. A process according to claim 5 wherein the fluid is water and wherein said decahydropyrazino [2,3-b] pyrazine is added to said water at a dosage rate of 1–15ppm per ppm of said hydrogen sulfide.

13. A process according to claim 1 wherein an aqueous solution of said decahydropyrazino [2,3-b] pyrazine is injected into an oil well at a dosage rate of 1–20 ppm per ppm of said hydrogen sulfide.

14. A process according to claim 1 wherein said fluid comprises a mixture of gas and crude petroleum, and said fluid is contacted in a washing tower with an aqueous solution of said decahydropyrazino [2,3-b] pyrazine at a dosage rate of 5–30ppm per ppm of said hydrogen sulfide.

15. A process for reducing the amount of free hydrogen sulfide present in a fluid comprising contacting said fluid with an aqueous solution comprising an effective amount of decahydropyrazino [2,3-b] pyrazine and for a period of time sufficient to reduce the level of free hydrogen sulfide in said fluid.

16. A process according to claim 15, wherein the fluid contains at least 5 moles per liter of hydrogen sulfide.

17. A process according to claim 15 wherein the amount of aqueous decahydropyrazino pyrazine in said solution is 0.1 to 5 moles decahydropyrazino [2,3-b] pyrazine per mole of hydrogen sulfide present in said fluid.

18. A process according to claim 17, wherein the fluid contains at least 5 moles per liter of hydrogen sulfide.

19. A process according to claim 15 wherein said fluid comprises a liquid in which said decahydropyrazino [2,3-b] pyrazine is soluble.

* * * * *